(12) United States Patent
Sampathkumar et al.

(10) Patent No.: US 10,191,855 B2
(45) Date of Patent: Jan. 29, 2019

(54) CACHING SYSTEMS AND METHODS FOR PAGE RECLAMATION WITH SIMULATED NVDRAM IN HOST BUS ADAPTERS

(71) Applicant: AVAGO TECHNOLOGIES INTERNATIONAL SALES PTE. LIMITED, Singapore (SG)

(72) Inventors: Kishore Kaniyar Sampathkumar, Bangalore (IN); Saugata Das Purkayastha, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 857 days.

(21) Appl. No.: 14/333,321

(22) Filed: Jul. 16, 2014

(65) Prior Publication Data

US 2016/0004465 A1 Jan. 7, 2016

Related U.S. Application Data

(63) Continuation-in-part of application No. 14/323,079, filed on Jul. 3, 2014, now Pat. No. 9,747,228.

(51) Int. Cl.
*G06F 12/00* (2006.01)
*G06F 12/123* (2016.01)
*G06F 12/0804* (2016.01)
*G06F 12/06* (2006.01)

(52) U.S. Cl.
CPC ........ *G06F 12/123* (2013.01); *G06F 12/0638* (2013.01); *G06F 12/0804* (2013.01)

(58) Field of Classification Search
None
See application file for complete search history.

(56) References Cited

U.S. PATENT DOCUMENTS

| | | | |
|---|---|---|---|
| 7,139,613 B2 | 11/2006 | Reinke et al. | |
| 8,402,226 B1 * | 3/2013 | Faibish | G06F 12/0804 710/52 |
| 8,555,000 B2 | 10/2013 | Jo | |
| 8,576,628 B2 | 11/2013 | Ueda | |
| 9,355,023 B2 | 5/2016 | Badam | |

(Continued)

OTHER PUBLICATIONS

Official Action for U.S. Appl. No. 14/323,079, dated Oct. 19, 2016 7 pages.

(Continued)

*Primary Examiner* — Reginald G Bragdon
*Assistant Examiner* — Michael L Westbrook
(74) *Attorney, Agent, or Firm* — Sheridan Ross P.C.

(57) ABSTRACT

Systems and methods presented herein provide for simulated NVDRAM operations. In a host system, a host memory is sectioned into pages. An HBA in the host system comprises a DRAM and an SSD. The DRAM and the SSD are also sectioned into pages and mapped to pages of the host memory. A host processor is operable to generate Input/Output (I/O) requests. An HBA driver is operable to process the I/O requests. The HBA driver is also operable to detect when the pages of the DRAM are accessed, to determine a rate of page reclamation based on the detection, and to reclaim pages of data in the DRAM by moving pages of data from the DRAM into the pages of the SSD based on the determined rate of page reclamation.

20 Claims, 7 Drawing Sheets

(56) References Cited

U.S. PATENT DOCUMENTS

| | | |
|---|---|---|
| 9,355,036 B2 | 5/2016 | Beard |
| 2006/0215452 A1 | 9/2006 | Forbes |
| 2010/0023682 A1* | 1/2010 | Lee .................... G06F 12/0246 |
| | | 711/103 |
| 2012/0026794 A1 | 2/2012 | Lueng |
| 2013/0111160 A1* | 5/2013 | Benhase ............... G06F 12/121 |
| | | 711/160 |
| 2013/0166834 A1* | 6/2013 | Mayhew ................ G06F 12/10 |
| | | 711/105 |
| 2013/0268727 A1 | 10/2013 | Sohn et al. |
| 2014/0029340 A1 | 1/2014 | Wang |
| 2014/0258595 A1 | 9/2014 | Venkatesha et al. |
| 2015/0193144 A1 | 7/2015 | Bilas et al. |
| 2015/0220452 A1 | 8/2015 | Purkayastha et al. |
| 2016/0004653 A1 | 1/2016 | Purkayastha et al. |
| 2016/0188410 A1 | 6/2016 | Lee |

OTHER PUBLICATIONS

Notice of Allowance for U.S. Appl. No. 14/323,079, dated Mar. 23, 2017 5 pages.

\* cited by examiner

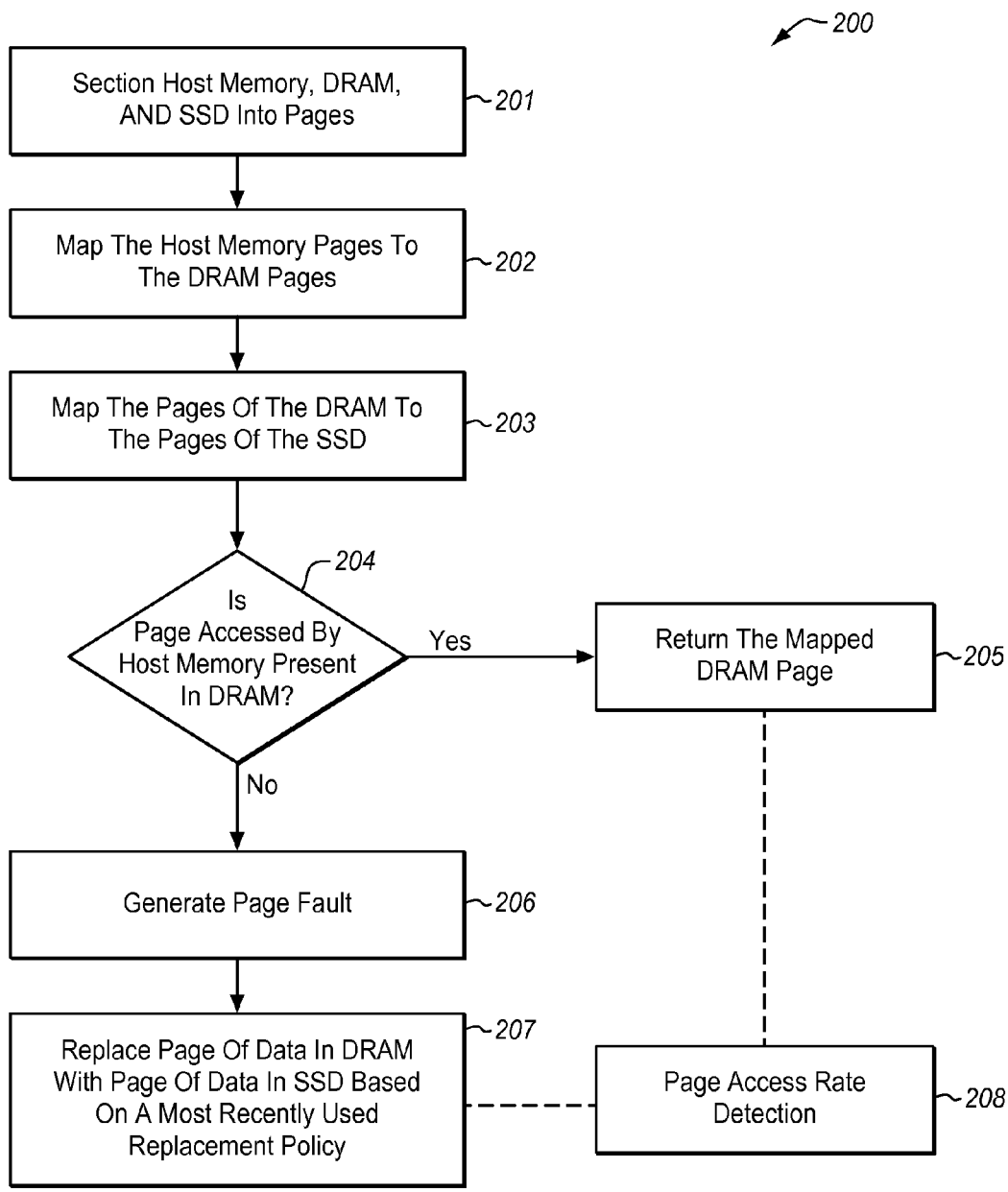

CACHING SYSTEMS AND METHODS FOR PAGE RECLAMATION WITH SIMULATED NVDRAM IN HOST BUS ADAPTERS

CROSS REFERENCE TO RELATED APPLICATIONS

This patent application is a continuation-in-part patent application, claiming priority to and thus the benefit of an earlier filing date from U.S. patent application Ser. No. 14/323,079 (filed Jul. 3, 2014) the entire contents of which are hereby incorporated by reference.

BACKGROUND

Non-Volatile Dynamic Random Access Memory (NVDRAM) is a combination of volatile memory and non-volatile memory, such as a Solid State Device (SSD), manufactured on a single device. The non-volatile memory acts as a shadow memory such that data stored in the volatile memory is also stored in the non-volatile memory. And, when power is removed from the device, the data of non-volatile portion of the NVDRAM remains even though the data in the DRAM is gone. Other implementations of SSD backed DRAM on separate devices are used when host system application capacity requirements are relatively small. However, in a Host Bus Adapter (HBA), physical NVDRAM and SSD backed DRAM options are generally not practical due to DRAM size limitations, power consumptions, and the like.

SUMMARY

Systems and methods presented herein provide for simulated NVDRAM operations. In a host system, a host memory is sectioned into pages. An HBA in the host system comprises a DRAM and an SSD for cache operations. The DRAM and the SSD are also sectioned into pages and mapped to pages of the host memory. A host processor is operable to generate Input/Output (I/O) requests. An HBA driver is operable to process the I/O requests. The HBA is also operable to detect when the pages of the DRAM are accessed, to determine a rate of page reclamation based on the detection, and to reclaim pages of data in the DRAM by moving pages of data from the DRAM into the pages of the SSD based on the determined rate of page reclamation.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 2A and 2B are flowcharts illustrating an exemplary process of the host system of FIG. 1.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
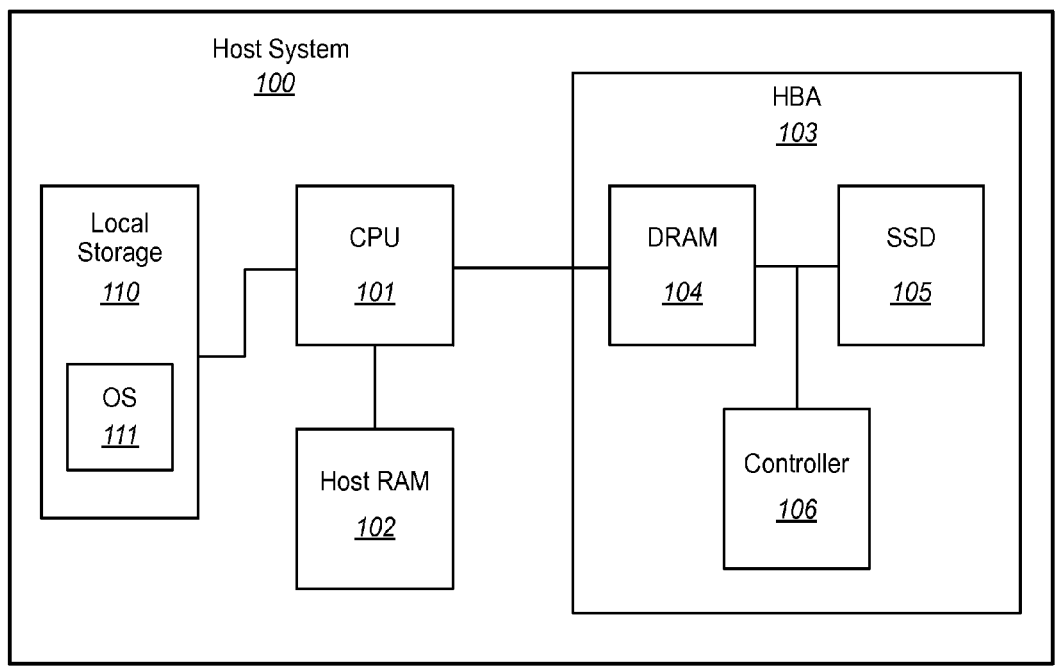
FIG. 1 is a block diagram of a host system employing an HBA for storage operations.

FIG. 1 is a block diagram of a host system 100 employing an HBA 103 for storage operations (e.g., in a storage system comprising one or more storage devices). The host system 100, as is typical with most processing systems, comprises a central processing unit (CPU) 101, host random access memory (RAM) 102, and local storage 110 (e.g., a local disk drive, SSD, or the like) comprising an operating system 111. The HBA 103 comprises a DRAM 104 that is backed by an SSD 105. The HBA 103 also comprises a controller 106 that is operable to, among other things, direct storage operations on behalf of the HBA 103. Thus, the HBA 103 is any device, system, software, or combination thereof operable to perform storage operations on behalf of the host system 100.

The CPU 101 is communicatively coupled to the HBA 103 through the DRAM 104 to map the SSD 105 to the host RAM 102 such that applications of the operating system 111 can directly access cached data of the HBA 103. For example, the operating system 111 comprises applications that are used by the host system 100 to perform a variety of operations. Some of those applications may be used to access data cached within the DRAM 104 of the HBA 103. And, the DRAM 104 is backed by the SSD 105 so the mapping allows the host RAM 102 to access data cached therewith and/or to store data therewith.

In this embodiment, the applications of the operating system 111 are operable to map large chunks of data cached in the SSD 105 of the HBA 103 to a virtual address space in the DRAM 104. Physically, the CPU 101 accesses the DRAM 104 over a memory bus or other I/O bus as with typical NVDRAM. But, in this "extended NVDRAM" embodiment, those operations are implemented with an HBA driver in the operating system 111.

The SSD 105 comprises a plurality of pages, each page being operable to fit within a page of the DRAM 104. The pages are removed, or "flushed", from the DRAM 104 to the SSD 105 such that other newer pages can be loaded from host RAM 102 to the DRAM 104, and vice versa, bypassing the operating system 111 and any protocol stacks (e.g., Small Computer Interface System "SCSI", Serial Attached SCSI "SAS", etc.).

The embodiments herein provide certain advantages for file system journals and database log file applications of the host system 100 that sequentially access pages of the DRAM 104. These and other advantages will become readily apparent in the following drawings and descriptions. Exemplary mapping and flushing operations of the host system 100 are now shown and described with respect to the flowcharts 200 of FIG. 2A and 208 of FIG. 2B.

The process of the flowchart 200 initiates with the sectioning and mapping of pages of the host RAM 102, the DRAM 104, and the SSD 105, as illustrated in FIG. 2A. For example, in the process element 201, each of the host RAM 102, the DRAM 104, and the SSD 105 are sectioned into pages for storing data. The pages of the host RAM 102 are mapped to the pages of the DRAM 104, in the process element 202, and the pages of the DRAM 104 are mapped to the pages of the SSD 105, in the process element 203. Generally, the SSD 105 comprises much more storage space than that of the DRAM 104.

When an application of the host system 100 requires data cached in the HBA 103, the CPU 101 attempts to locate the page in the DRAM 104, in the process element 204. For example, the DRAM 104, being mapped to the SSD 105, operates as a window to the SSD 105 through which the CPU 101 retrieves cached data. In doing so, however, the page of data may not be present in the DRAM 104 (i.e., the process element 204), causing the operating system 111 to generate a page fault, in the process element 206. Otherwise, the page of data is already available in a mapped page of the DRAM 104, and hence is just returned to the caller in the process element 205 without requiring any further access to SSD 105.

Returning to the page fault scenario of the process element 206, the CPU 101 replaces the pages that the RAM 104 with a page of data in the SSD 105 based on the most recently used (MRU) page replacement policy, in the process element 207. Generally, however, this process invokes certain page fault management processes by the operating system 111 that tend to increase page loading latencies. To overcome such, the process incorporates a page access rate detection element 208 that is operable to monitor when pages are being accessed and to determine a rate at which the pages are being reclaimed in the DRAM 104.

This embodiment is particularly useful when sequential write I/Os are being performed on the simulated in the DRAM, particularly for logs that are "circular" in nature, such as transaction log files and file system journals. In this regard, the MRU page replacement policy can be configured to implement more efficient processing of sequential I/O write requests. For example, since the access pattern is established as sequential with an MRU policy, pages may be adaptively chosen for reclamation based on a rate of access from the DRAM 104.

Figure 2B:
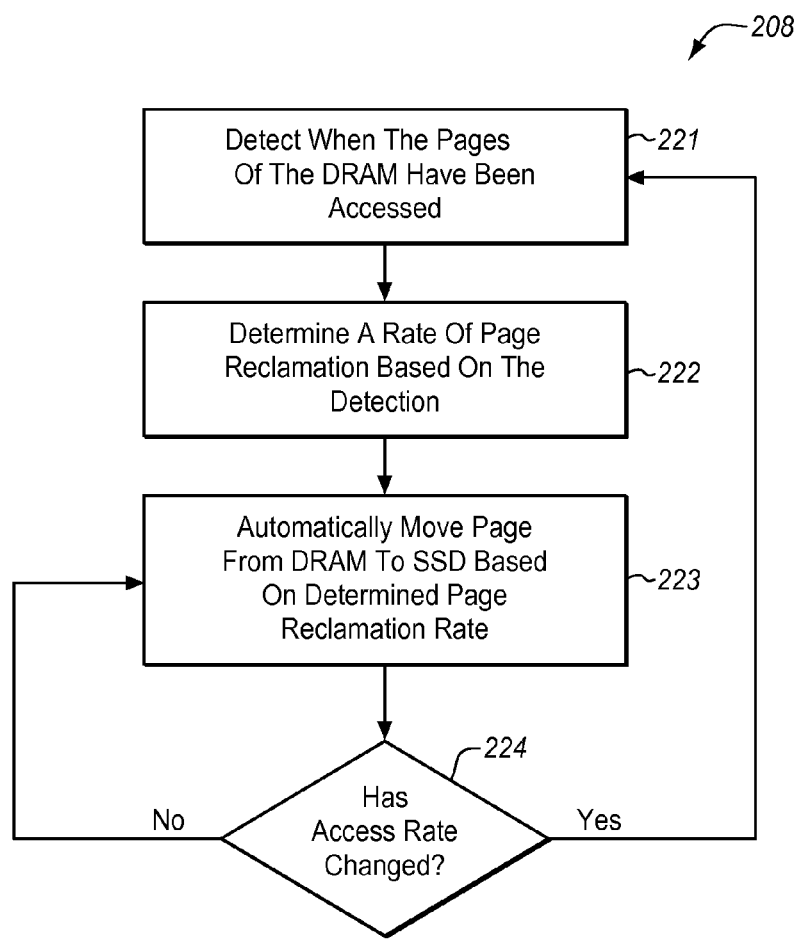

Accordingly, the process element 208 directs the CPU 101 to detect when pages of the RAM 104 have been accessed, in the process element 221, as illustrated in FIG. 2B. The CPU 101 then determines a rate of page reclamation based on that detection, in the process element 222. With the rate of page reclamation determined, the CPU 101 may then automatically move pages from the DRAM 104 into SSD 105, in the process element 223. The CPU 101 periodically determines when the page access rate has changed, in the process element 224, so as to adaptively reconfigure the page reclamation rate. For example, a background thread within the driver in the operating system 111 may run periodically (e.g., a lower interrupt request priority) to identify when pages are recently accessed. Pages that should be flushed can be selected a priori using the MRU policy. And, the rate of page reclamation may be a sort of feedback loop that can be adjusted to occur more frequently if the rate of page consumption changes. Additional details regarding the mapping and flushing of data pages are now exemplarily shown and described in FIGS. 3, 4A and 4B.

Figure 3:
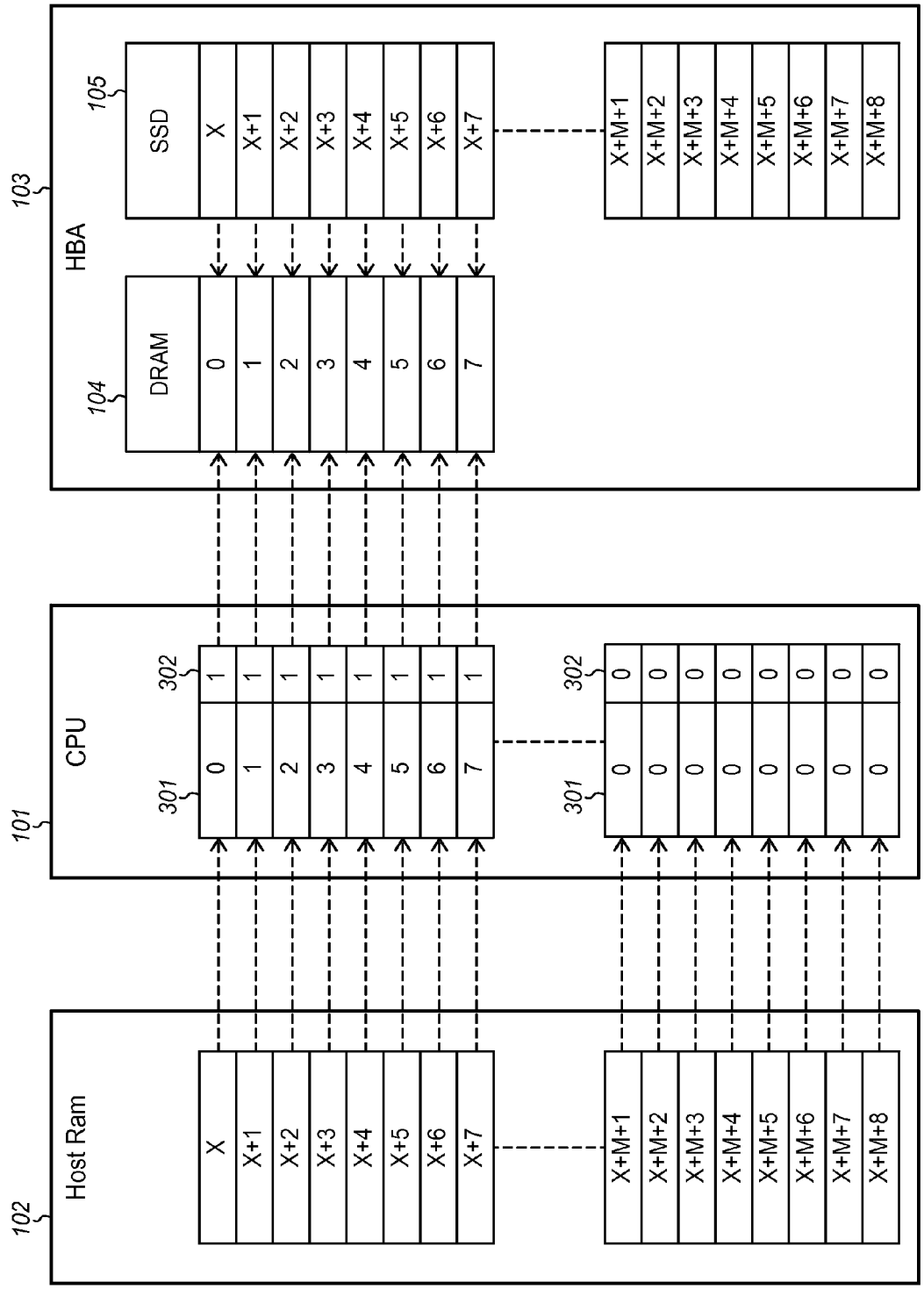
FIG. 3 is a block diagram illustrating an exemplary mapping between host memory and memory of the HBA.

FIG. 3 is a block diagram illustrating an exemplary mapping between the host RAM 102 and the DRAM 104 of the HBA 103. The SSD 105 of the HBA 103 is split into pages X through (X+M+8), wherein the references of "X" and "M" are merely intended to represent integers with values greater than 1 and not necessarily equal to any other "X" and "M" references herein. Page table entries are established for the pages of the SSD 105 in the operating system 111 and allow the CPU 101 to determine whether a page is available in the DRAM 104. For example, pages that are available in the DRAM 104 have a "present" bit 302 established as a logical "1" in the operating system 111 so as to point to the correct valid page in the DRAM 104. If the page is not present in the DRAM 104, the present bit 302 established as a logical "0" in the operating system 111 showing that the page is invalid, thus directing the CPU 101 to retrieve the data from the SSD 105 when directed. If space exists in the DRAM 104, the CPU 101 may pull required data into the unused portions of the DRAM 104. Otherwise, the CPU 101 will make space by flushing pages of data occupying the DRAM 104 to the SSD 105.

As exemplarily illustrated in this embodiment, the page table entries point the CPU 101 to the pages 0-7 in the DRAM 104 and thus the pages X through X+7 of the SSD 105. The remaining page table entries are marked as invalid which would direct the CPU 101 to pull data from the SSD 105 when needed, or vice versa. Initially, page table entries are marked as invalid such that the pages can be loaded on demand.

With this mapping established, accesses by the host applications to the pages present in the DRAM 104 are direct (e.g., Direct Memory Access, or "DMA"). Thus, operations such as load/store operations of the operating system can bypass any operating system routine or protocol stack. And, when an application of the host system 100 accesses a page which is not present in the DRAM 104, the CPU 101 generates a page fault to the operating system 111. The operating system 111 handles the page fault by identifying unused portions of the DRAM 104, and hence proceeds to directly load a requested page of data from the SSD 105 into an unused page in the DRAM 104. However, if there are no unused portions, the CPU 101 also generates a page fault to the operating system 111 but the operating system 111 handles the page fault by replacing the page of data in the DRAM 104 based on a most recently used (MRU) page policy. An example of this process is shown and described in FIGS. 4A and 4B.

Figure 4A:
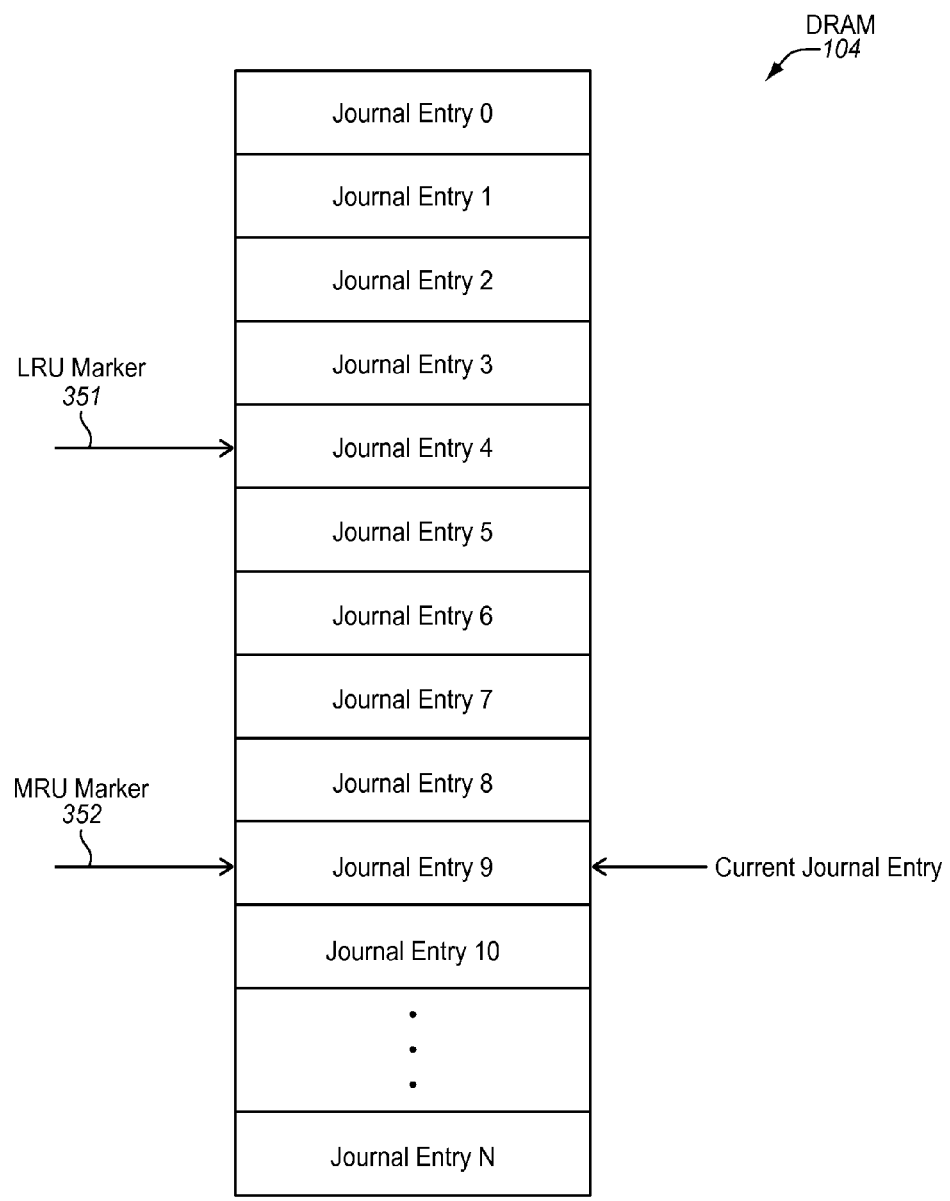
FIGS. 4A and 4B illustrate exemplary page flushing of a simulated NVDRAM.
Figure 4B:
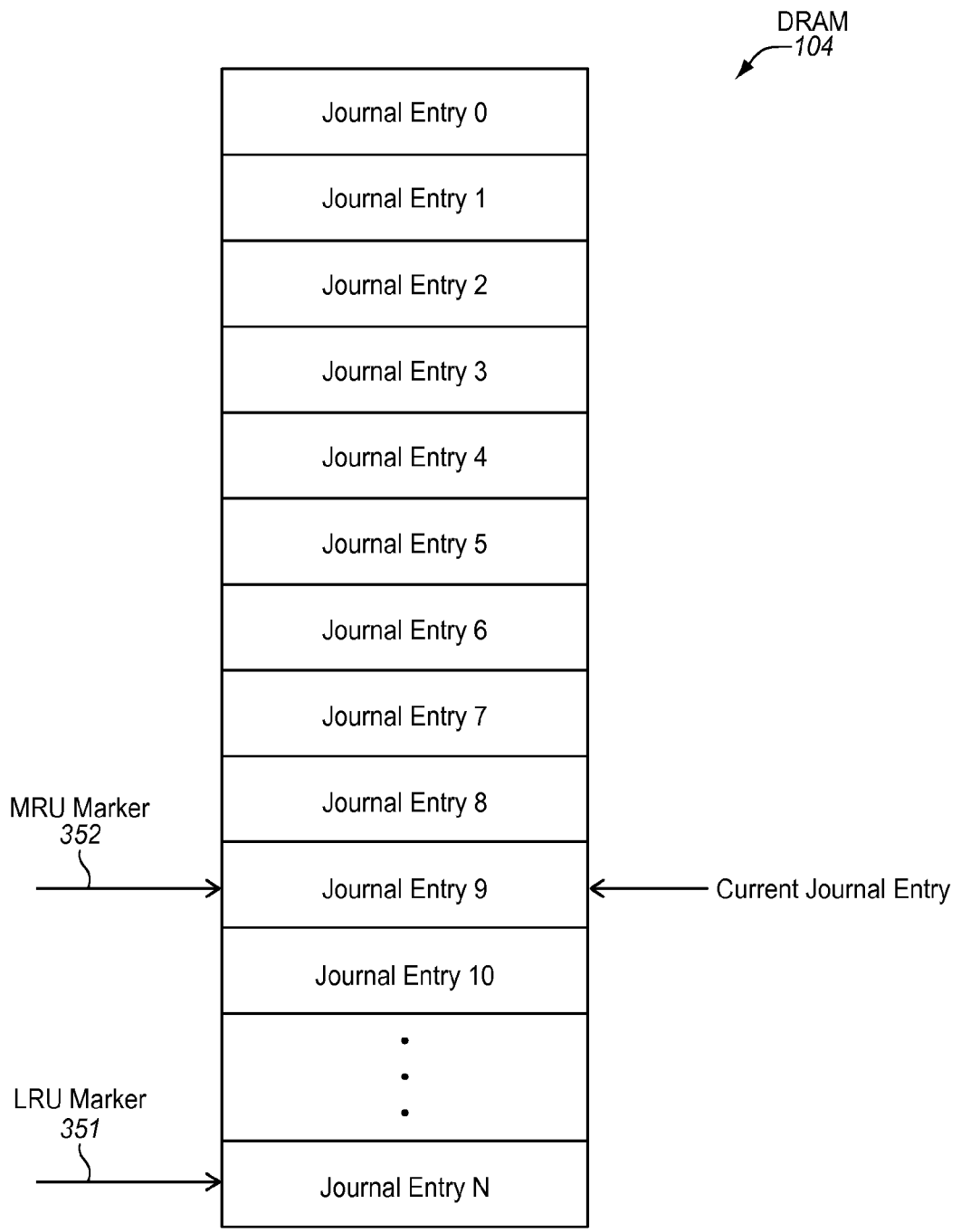

In FIGS. 4A and 4B, journal entries of a file system exist as pages of data in the DRAM 104. Generally, the loading of pages of data from the SSD 105 to the DRAM 104 happens during a page fault yet reduces the latency of page fault management by the operating system 111. This reduction in latency is achieved by attempting to maintain a certain number of free pages. Such may still incur the latency related to "page in" operations, but it avoids the latency of page fault management associated with a complete page replacement (e.g., where every page in operation is preceded by a page out operation). As shown in FIGS. 4A and 4B, a current journal entry is deemed the "head" of the journal since it is the most recently used entry (i.e., the MRU entry) illustrated by the MRU marker 352. The "tail" of the journal is the least recently used journal entry and is illustrated as the LRU marker 351.

The journal entries, being MRU based, are traversed in one direction in a circular manner (e.g., from top to bottom) and wrap around after traversing the end of the journal entries (e.g., journal entry N), as illustrated in FIG. 4A and FIG. 4B. The number of entries between the MRU marker 352 and the LRU marker 351 provides the "distance" after which page replacement needs to be performed before a new journal entry can be allocated. The user or administrator can define one value for this distance called a "low watermark". For example, the low watermark may represent a minimum threshold for free pages to be maintained in the DRAM 104. Similarly, the user or administrator can define another value for this distance called a "high watermark". For example, the high watermark may represent the maximum threshold of free pages to be maintained in the DRAM 104. As soon as the low watermark is reached, the background thread within the driver of the operating system 111 automatically executes the process to start freeing up pages by initiating page out operations. And, as soon as the high watermark is reached, the thread goes to "sleep".

The distance between the MRU marker 352 and the LRU marker 351 may be configurable or "tuned" to specify when the background thread within the driver should execute to start freeing up pages by initiating page out operations. For example, the corresponding "low watermark" can be adaptively adjusted by changing the distance between the MRU marker 352 and the LRU marker 351. In this regard, the background thread within the driver of the operating system 111 may be operable to change based on the rate of consumption of data existing in pages of the DRAM 104. The driver, in this case, maintains a counter to determine how many times the low watermark has been reached over a given period time. The rate at which this happens causes the driver to automatically establish the rate at which the pages need to be freed in the DRAM 104 (e.g., slow, medium, or fast).

The above embodiments provide certain advantages over the prior art, such as allowing the system to run large data transfers while the associated database log files and file system journals are placed in a type of NVDRAM environment. For example, the applications described herein provide an interface for placing large database log files and file system journals into the extended NVDRAM embodiments above. The data accesses and updates may be random but the corresponding accesses and updates to the database log files and file system journals are mostly sequential. The replacement policy for the database log files and file system journals may be set to MRU.

It should be noted that the invention is not intended be limited to any particular number of pages or regions. Additionally, replacement algorithms for replacing pages in the DRAM 104 based on priorities may be performed in a variety of ways as a matter of design choice. The embodiments shown and described herein may be implemented in a variety of operating systems 111 as a matter of design choice. A few examples of other operating systems in which the embodiments herein may be employed include UNIX, Microsoft Windows, Apple operating systems, and Linux.

Figure 5:
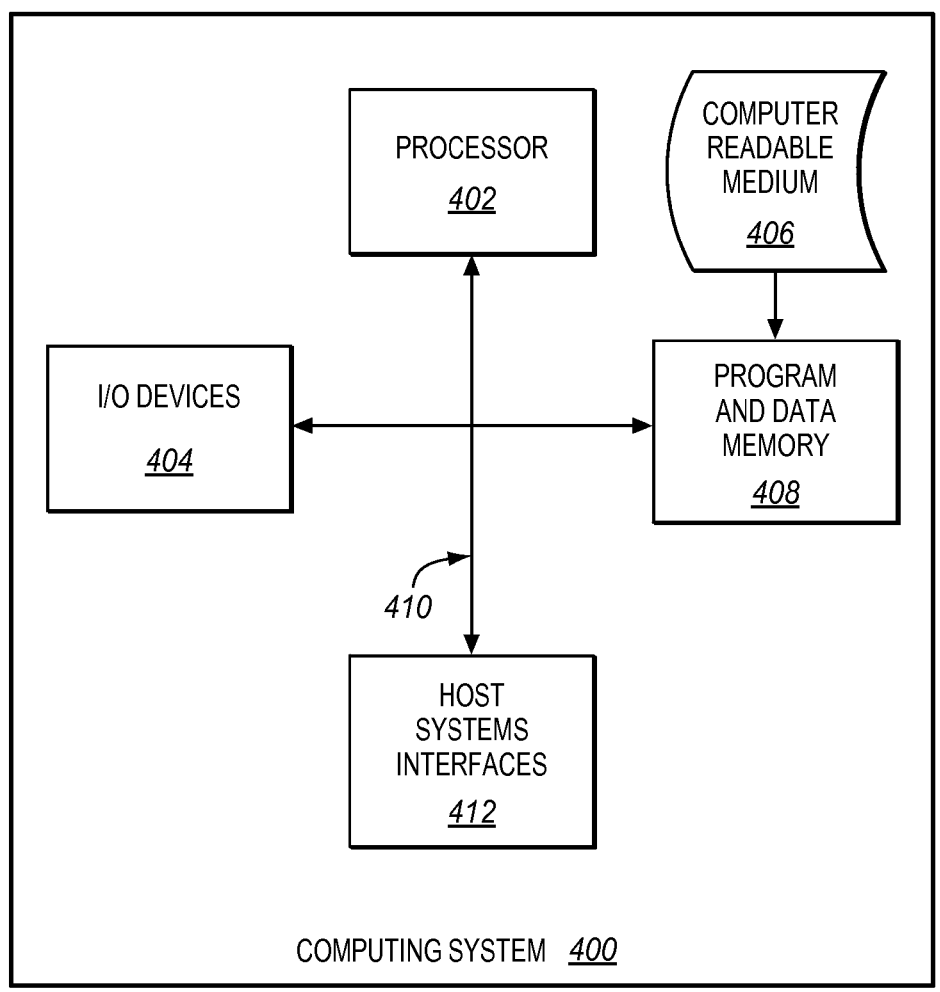
FIG. 5 illustrates an exemplary computer system operable to execute programmed instructions to perform desired functions.

Additionally, the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A system, comprising:
a host processor operable to generate Input/Output (I/O) requests;
a host memory communicatively coupled to the host processor and sectioned into pages;
a host bus adapter (HBA) communicatively coupled to the host processor to process the I/O requests, wherein the HBA comprises a Dynamic Random Access Memory (DRAM) and a Solid State Memory (SSD); and
an HBA driver operable on the host processor wherein the DRAM is sectioned into pages mapped to pages of the host memory, and the SSD is sectioned into pages mapped to pages of the DRAM, and
wherein the HBA driver is operable to detect a rate at which the pages of the DRAM are accessed for both of read requests and write requests of the I/O requests, to determine a rate of page reclamation based on the detection, and to reclaim pages of data in the DRAM by moving pages of data from the DRAM into the pages of the SSD based on the determined rate of page reclamation.

2. The system of claim 1, wherein:
the HBA driver is further operable to adaptively update the rate of page reclamation based on the detection, and wherein the HBA driver is operable to detect the rate at which the pages of the DRAM are accessed for all of the read and write requests.

3. The system of claim 2, wherein:
the HBA driver is further operable to adaptively update the rate of page reclamation by changing a distance between journal entry markers in the DRAM based on the rate at which the pages of the DRAM are accessed.

4. The system of claim 1, wherein:
the HBA driver is further operable to adaptively update the rate of page reclamation by changing a distance between journal entry markers in the DRAM based on the rate at which the pages of the DRAM are accessed;
the detection is based on a Most Recently Used (MRU) page replacement policy; and
the distance corresponds to a number of journal entries between an MRU marker indicating a most recently used journal entry and a Least Recently Used (LRU) marker indicating a least recently used journal entry.

5. The system of claim 1, wherein:
the HBA driver is further operable to process the I/O requests through a storage protocol stack, and to run as background processing to perform the detection, the determination of the rate of page reclamation, and the page reclamation outside of the storage protocol stack.

6. The system of claim 1, further comprising:
an operating system operable to direct the processor to generate a page fault when an application running on host processor attempts to load the page of data into the DRAM and determines that the data is not in the DRAM.

7. The system of claim 1, wherein:
the SSD maintains data of the DRAM during a power outage.

8. A method operable in a host system comprising a host processor, a host memory, a host bus adapter (HBA), and an HBA driver operable on the host processor, the HBA comprising a Dynamic Random Access Memory (DRAM) and a Solid State Memory (SSD), the method comprising:
sectioning the host memory into pages;
sectioning the DRAM into pages;
sectioning the SSD into pages;
mapping the host memory pages to the DRAM pages;
mapping the pages of the DRAM to the pages of the SSD to provide the host processor with direct access to the pages of the SSD through the DRAM;
detecting a rate at which the pages of the DRAM are accessed for both of read requests and write requests;
determining a rate of page reclamation based on the detection; and
replacing pages of data in the DRAM by loading pages of data from the SSD into the pages of the DRAM based on the determined rate of page reclamation.

9. The method of claim 8, further comprising:
adaptively updating the rate of page reclamation based on the detection, wherein the adaptively updating includes increasing the rate of page reclamation if the rate at which the pages of the DRAM are accessed changes, and wherein the detecting includes detecting the rate at which the pages of the DRAM are accessed for all of the read and write requests.

10. The method of claim 9, wherein:
adaptively updating the rate of page reclamation includes changing a distance between journal entry markers in the DRAM based on the rate at which the pages of the DRAM are accessed.

11. The method of claim 8, further comprising:
adaptively updating the rate of page reclamation by changing a distance between journal entry markers in the DRAM based on the rate at which the pages of the DRAM are accessed, wherein:
the detecting is based on a Most Recently Used (MRU) page replacement policy; and
the distance corresponds to a number of journal entries between an MRU marker indicating a most recently used journal entry and a Least Recently Used (LRU) marker indicating a least recently used journal entry.

12. The method of claim 8, further comprising:
processing the I/O requests through a storage protocol stack of the host system; and
running a driver via background processing to perform said detecting, said determining, and said replacing outside of the storage protocol stack.

13. The method of claim 8, further comprising:
generating a page fault when an application attempts to load the page of data into the DRAM and determines that the data is not in the DRAM.

14. The method of claim 8, wherein:
the SSD maintains data of the DRAM during a power outage.

15. A non-transitory computer readable medium comprising instructions that, when directed by a processor in a host system comprising a host memory, a host bus adapter (HBA), and an HBA driver, the HBA comprising a Dynamic Random Access Memory (DRAM) and a Solid State Memory (SSD), direct the processor to:
section the host memory into pages; section the DRAM into pages;
section the SSD into pages;
map the host memory pages to the DRAM pages;
map the pages of the DRAM to the pages of the SSD to provide the host processor with direct access to the pages of the SSD through the DRAM;
detect a rate at which the pages of the DRAM are accessed for both of read requests and write requests;
determine a rate of page reclamation based on the detection; and
reclaim pages of data in the DRAM by moving pages of data from the DRAM into the pages of the SSD based on the determined rate of page reclamation.

16. The computer readable medium of claim 15, further comprising instructions that direct the processor to:
adaptively update the rate of page reclamation based on the detection by increasing the rate of page reclamation if the rate at which the pages of the DRAM are accessed changes; and
detect the rate at which the pages of the DRAM are accessed for all of the read and write requests.

17. The computer readable medium of claim 16, further comprising instructions that direct the processor to:
adaptively update the rate of page reclamation by changing a distance between journal entry markers in the DRAM based on the rate at which the pages of the DRAM are accessed.

18. The computer readable medium of claim 15, further comprising instructions that direct the processor to:
adaptively update the rate of page reclamation by changing a distance between journal entry markers in the DRAM based on the rate at which the pages of the DRAM are accessed; and
detect when the pages of the DRAM have been accessed based on a Most Recently Used (MRU) page replacement policy, wherein the distance corresponds to a number of journal entries between an MRU marker indicating a most recently used journal entry and a Least Recently Used (LRU) marker indicating a least recently used journal entry.

19. The computer readable medium of claim 15, further comprising instructions that direct the processor to:
process the I/O requests through a storage protocol stack of the host system; and run a driver as background processing to perform said detecting, said determining, and said replacing outside of the storage protocol stack.

20. The computer readable medium of claim 15, further comprising instructions that direct the processor to:
generate a page fault when an application running on the processor attempts to load the page of data into the DRAM and determines that the data is not in the DRAM.

* * * * *